April 10, 1962    R. L. BROWN    3,029,333
CIRCULAR WELDING DEVICE
Filed March 6, 1961    3 Sheets-Sheet 1

INVENTOR.
ROBERT L. BROWN
BY
Beau, Brooks, Buckley & Beau.

INVENTOR.
ROBERT L. BROWN

April 10, 1962     R. L. BROWN     3,029,333
CIRCULAR WELDING DEVICE
Filed March 6, 1961     3 Sheets-Sheet 3

INVENTOR.
ROBERT L. BROWN
BY
Beau, Brooks, Buckley & Beau.

United States Patent Office 3,029,333
Patented Apr. 10, 1962

3,029,333
CIRCULAR WELDING DEVICE
Robert L. Brown, Kenmore, N.Y., assignor to
Bell Aerospace Corporation, Wheatfield, N.Y.
Filed Mar. 6, 1961, Ser. No. 93,693
6 Claims. (Cl. 219—82)

This invention relates to welding machines in general and more particularly relates to a spot welding machine having a welding head movable in a circular path and particularly adapted for welding thin sheet or gauze material.

In the fabrication of various component parts such as for example bellows or the like, it is frequenly desirable to be able to effect the spot welding of extremely thin sheet or gauze material in a continuous circular path. Also it is frequently necessary to effect such construction method on materials which are relatively difficult to weld, such as stainless steel. It is therefore a primary concern in connection with the present invention to provide an attachment device which may be utilized in conjunction with a conventional spot welding machine which will permit the generation of a circular weld path as aforesaid.

Another object of this invention is to provide an attachment as set forth above in which means is provided for changing the radius of the weld path generated so that the machine is usable for a variety of different operations.

A further object in connection with the present invention is the provision of a relatively simple mechanism for the purpose intended, which, at the same time, possesses sufficient adjustability so as to accommodate a wide variety of circular weld paths, and as well incorporates means whereby the feed along the weld path may be varied not only to accommodate for the length of the circumferential path and variation therein as the radius is varied, but also to compensate for and adjust to the particular thickness and characteristics of the material being welded so that a proper weld may be effected under any circumstance of use.

A further object of this invention is to provide a machine of the character described in which a disc-like welding head is adjustably carried by a rotatable carrier so as to be placed at a variety of fixed positions relatively spaced from the axis of rotation of the carrier and in which means is provided for driving the carrier at selected various speeds of rotation so that the welding speed may be adjusted to suit the thickness of material being welded and to accommodate for the circumferential length of the welding path as dictated by the particular radial spacing of the welding head from the rotational axis of the carrier.

Still another object of this invention resides in the provision of an efficient yet simple assemblage in accordance with the preceding objects and wherein provision is made for effective cooling of the component parts thereof during operation of the machine.

Other objects and advantages of the invention will appear from the detailed description hereinafter and the accompanying drawings wherein.

Figure 1:
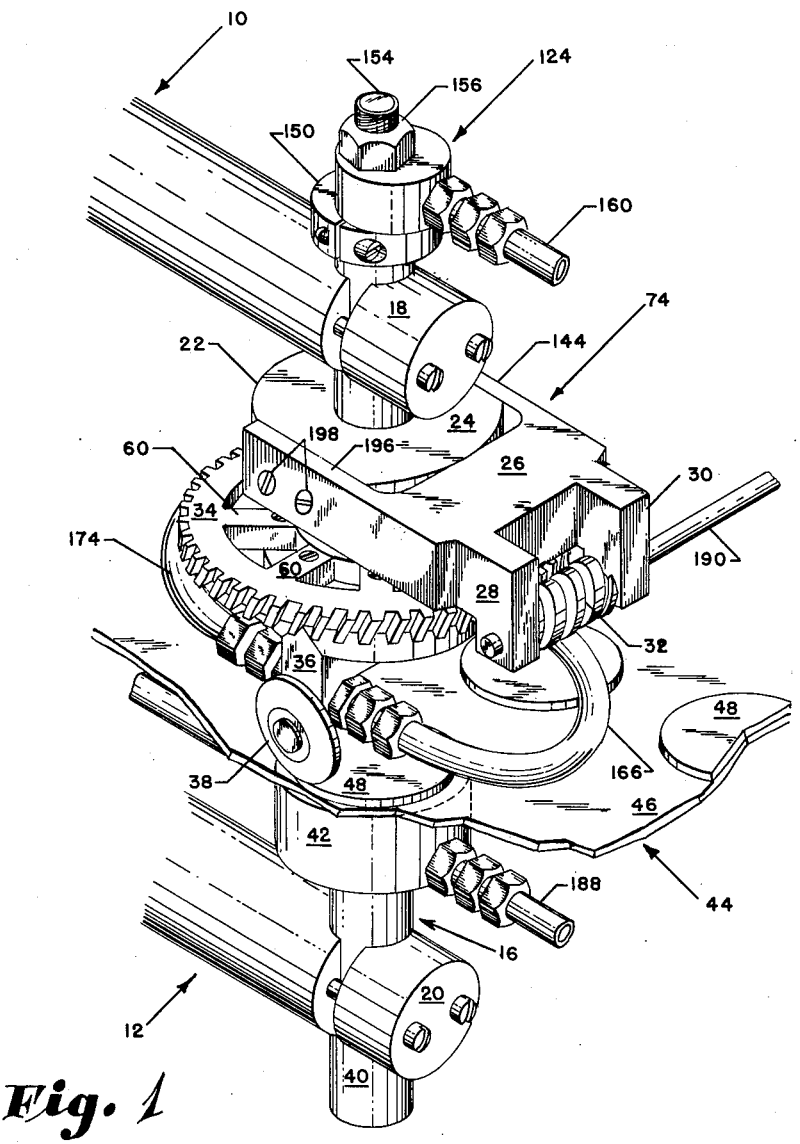
FIG. 1 is a perspective view showing a portion of a conventional spot welding machine and illustrating in association therewith the attachment in accordance with the present invention and illustrating also a portion of a workpiece associated with the attachment.

Referring at this time more particularly to FIG. 1, the mechanism as shown therein illustrates electrode portions 10 and 12 of a conventional spot welding machine, the details of which form no part of the present invention. The attachment according to this invention includes an upper section indicated generally by the reference character 14 and a lower or anvil section indicated generally by the reference character 16. These two sections are carried respectively by the two electrodes 10 and 12 by means of clamping heads 18 and 20, the details of which also form no part of the present invention since they are required only to effect a clamping action of the two sections 14 and 16 relative to the electrodes 10 and 12 and to hold them properly in position relative to each other.

The upper section 14 includes a spindle member 22 having an enlarged mounting head 24 rigid with the lower end thereof. The spindle 22 is clamped directly to the electrode 10 by the head 18 and therefore remains spatially fixed. A drive frame 26 is rigidly mounted on the mounting head 24 to extend laterally therefrom and rotatably carries a worm gear 32 between the laterally projecting and depending arms 28 and 30 thereof. Rotatably mounted on a portion of the attachment hereinafter described is a worm wheel 34 which is in engagement with the worm gear 32 and is rotated thereby. Associated also with this worm wheel 34 is a carriage 36 which is so mounted as to be movable radially of the axis of rotation of the wheel 34 in a manner hereinafter more fully described and which carrier 36 mounts a rotatable welding head disc 38 which constitutes the work-engaging member, as will be clearly evident in FIG. 1. The anvil 16 includes a spindle or shank 40 which is rigidly clamped by the head 20 to be fixed relative to the electrode 12 and is spaced below the welding head disc 38 and terminates in an enlarged work supporting head portion 42 substantially as shown. It will be appreciated that the adjustment between the two sections 14 and 16 is such as to achieve the proper engagement between the welding head 38 and the work which is indicated in FIG. 1 generally by the reference character 44.

At this point, it may be well to state the general nature of the work to be performed by the machine. In FIG. 1, the work assemblage 44 consists simply of a base plate 46 and a series of disks or circular elements 48 placed thereon. Each of the disks 48 is to be welded circumferentially thereof to the base plate 46 whereafter the disks and the portions of the base plate 46 to which they are directly welded may be separated from the main mass of material by cutting, stamping or other suitable operations. It will be understood that the FIG. 1 showing of the workpiece construction is simplified for the purpose of clarity and does not necessarily constitute any particular specific type of work contemplated for the machine. Rather, the work assemblage in FIG. 1 is simply to show that the invention concerns itself with an attachment as described herein which lends itself readily to the generation of a circular weld path and in such manner as to be particularly suited for thin sheet-like material or screen material or the like such as is encountered for example in the manufacture of bellow members.

Figures 3, 4:
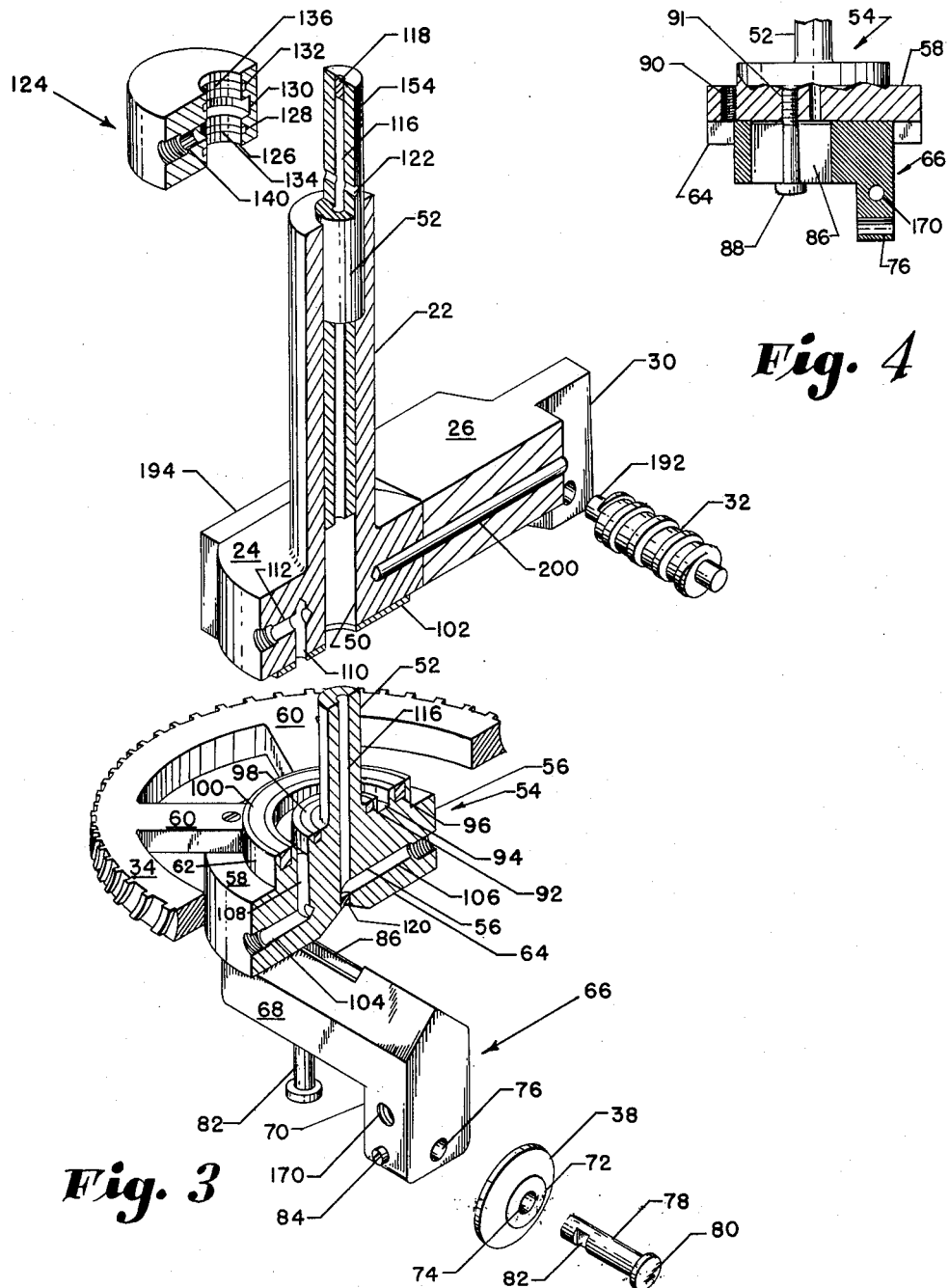
FIG. 3 is an exploded perspective view, partly in section, showing details of the internal construction of the device.
FIG. 4 is a vertical section through a portion of the attachment device.

Referring now more particularly to FIG. 3, the details of the internal construction of the attachment will be clearly evident therefrom. The previously mentioned spindle 22 will be seen to be provided with an axially extending bore 50 which rotatably receives the shank 52 of the welding head assembly indicated generally by the reference character 54. The welding head assembly 54 includes an enlarged head portion 56 at the lower end of the shank 52, which head is preferably of circular configuration and is provided with a stepped portion 58 on its upper side to receive the radial spokes 60 of the worm gear 34. These spokes 60 are arcuately machined at their inner ends to seat against the hub portions 62 of the head 56 and the depth of the shoulder portion 58 is such as to permit the worm gear 34 to lie slightly below the surface of the hub portion 62.

The undersurface of the head 56 is provided with a diametrically extending V-shaped notch 64 within which a V-shaped carriage block indicated generally by the reference character 66, is adapted to ride. This carriage block is of generally L-shaped configuration having the horizontal leg portions 68 and a depending leg portion 70. The upper surface of this block is V-shaped as is shown to conform to the shape of the notch 64 in the undersurface of the head 56, and means is provided for permitting the assembly 66 to be shifted back and forth relative to the head 54 so as to dispose the circular welding head 38 in different radial positions relative to the axis of rotation of the shank 52. The welding disc 38 will be seen to have a central hub portion 72 provided with an opening 74 registrable with the opening 76 through the leg 70 and a retaining pin 78 having an enlarged headed portion 80 is adapted to be received through these two openings 74 and 76 to rotatably mount the disc 38 upon the legs 70. The retaining pin 78 is provided with a flap or notch 82 engageable by a set screw 84 carried by the leg 70 so as to retain the pin in place.

The means for retaining the block 66 in various adjusted positions relative to the head 54 is shown in FIG. 4. It will be seen that the block 66 is provided with an elongate slot 80 intermediate its ends adapted to receive a headed fastening member 82 which projects therethrough into one of several threaded bores 84 provided in the head 54 so as to permit the block 66 to have a full range of adjustment relative to the head 54 to accommodate for the various diameters of workpieces to be associated therewith.

The upper surface of the hub 62 of head member 54 is provided with three concentric grooves 92, 94 and 96, the inner and outer of which (92 and 96) receive packing material 98 and 100 respectively, engageable against the undersurface of a wear plate 102 affixed in any suitable manner to the undersurface of the head 54. The head 54 is provided with a pair of diametrically extending bores 104 and 106, the former of which intersects with a bore 108 which is an extension of the intermediate groove 94 so as to establish communication therebetween. The wear plate 102 and the head 24 are provided with a bore 110 which registers with the groove 94 and this bore 110 is intersected by horizontal bore 112 which opens into the side of the head 24 substantially as is shown.

The shank 52 is provided with an axially extending bore 116 which is plugged at the upper and lower ends thereof as indicated by the reference characters 118 and 120 and which intersects with the previously mentioned bore 106 in the head 54. The upper extremity of the shank 52 is exposed beyond the upper end of the shank 22 and is provided in this region with a transverse bore 122 which represents the inlet for the cooling water system associated with the attachment. A coupling head indicated generally by the reference character 124 is provided with an eccentrically exposed bore 126 having internal grooves 128, 130 and 132 therein of which grooves 128 and 132 are fitted with packing material 134 and 136 and the intermediate groove 130 of which is intersected by the radial bore 140. The coupling member 124 is freely rotatably received on the exposed upper end of the shank 52 so that the groove 130 therein is in register with the diametrical bore 122. To adjust the rate of water flowing into the attachment, the coupling member 124 may be shifted up and down relative to the shank 52 to effect a greater or lesser degree of alinement between the groove 130 and the bore 122. This is accomplished by means of a split collar member 150 having a screw fastener 152 provided to draw the split ends of the same together and clamp upon the spindle 22. The extreme upper end of the shank 52 is threaded as at 154 to receive a retaining nut 156 to prevent the coupling member 124 from working up on the spindle 52. When it is desired to effect a flow adjustment, the collar 152 is either raised or lowered to effect the desired degree of alinement between groove 130 and bore 122 and nut 156 is correspondingly adjusted to permit the coupling member 124 to be freely rotatable therebetween but disposed at a particular position to effect the desired flow characteristics into the attachment without necessitating inlet water flow control.

To direct the coolant throughout the system, various flexible coupling hoses are utilized. This is illustrated best in FIG. 2. In this figure, the inlet for the system will be seen to consist of a flexible inlet hose 160 suitably coupled as by the coupling means 162 to communicate with the bore 140 in the coupling member 124 and thus feed water downwardly through the shank 52. The inlet water then enters the head 54 to cool the same and is educted therefrom through the bore 106 which is connected by means of a coupling 164 to a flexible hose 166 which leads therefrom to be coupled as at 168 to one side of the carriage block 66. The carriage block 66 is provided with a transverse bore 170 and the cooling water flows therethrough to cool the block 66 and is educted therefrom by means of the flexible line 174 coupled to the block as at 176 and extending therefrom to be coupled as at 178 to communicate with the previously mentioned bore 104 in the head 54. The cooling water at this point reenters the head 54 and flows through the bore 104 and up the bore 108 and into the groove 94 whereupon it returns to the member 24 through the bore 110 and passes outwardly therefrom through the bore 112 to which is coupled, as at 180, the flexible outlet line 182.

Means is also provided for cooling the anvil head 42. The anvil head is provided with a transverse bore to which are coupled, as at 184 and 186 respectively, the flexible inlet and outlet lines 188 and 190. Thus, the entire assemblage is adequately cooled for such continuous operational requirements as are necessary.

Figure 2:
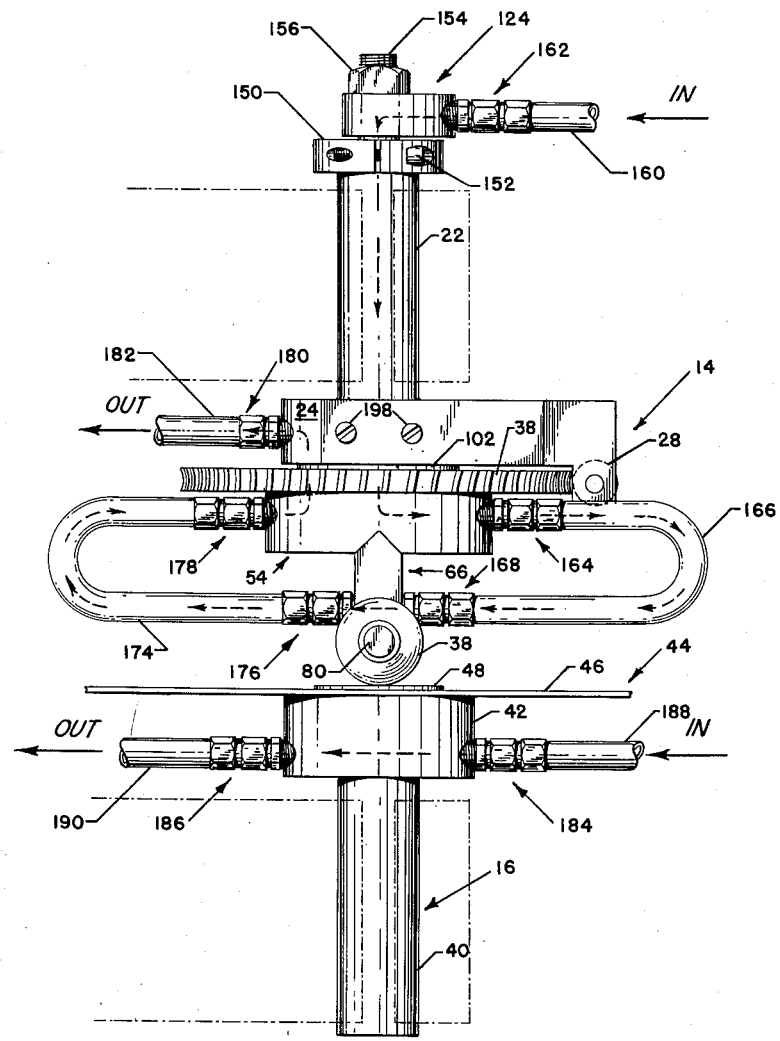
FIG. 2 is an elevational view of the attachment as shown in FIG. 1.

As has been previously stated, it is desirable to alter the speed of rotation of the carrier or head assembly in accordance not only with the length of the circumferential weld path but also in accordance with the thickness or characteristics of the material being welded. To this end, it will be appreciated that any suitable variable speed drive means may be associated with the attachment which is connected thereto through the medium of a flexible shaft member 190, see particularly FIG. 1. The shaft 190 is coupled by any suitable or conventional means to the end 192 of the shaft which carries the worm gear 32, see particularly FIG. 3. This shaft, which may be formed integrally with or separately from the gear 32 extends beyond the opposite ends of the gear for rotatable reception within the legs 28 and 30 of the assembly 26. The assembly 26, as previously stated, is rigidly affixed to the head portion 24 and to this end is provided with a pair of spaced legs 194 and 196 which straddle head 24 and are engaged thereagainst on opposite sides thereof, flats being provided on the head 24 for this purpose. Suitable fasteners 196, see particularly FIG. 2, are provided for anchoring the legs 194 and 196 to the member 24. Additionally, there may be provided a staking pin 200 as is shown in FIG. 3 which extends through the main body portion 26 and into the member 24 for relieving the fastening elements 196 of some of the shear load which would otherwise be imposed thereon, incident to operation of the attachment.

While preferred embodiments of the present invention have been described, it is to be understood that it is not to be limited thereto but may be otherwise embodied within the scope of the following claims.

What is claimed is:

1. An attachment for a spot welding machine, comprising a spindle adapted to be fixedly secured to an electrode of a spot welding machine, a carrier rotatably mounted on said spindle, a circular welding head journalled on said carrier about an axis disposed normal to the axis of rotation of said carrier, and means for rotating said carrier.

2. An attachment for spot welding machines, comprising a spindle assembly adapted to be fixed to an electrode of a spot welding machine, a welding head assembly having a shank portion rotatably received in said spindle assembly axially thereof, a worm wheel fixed to said welding head assembly below said spindle assembly, a worm gear carried by said spindle assembly meshing with said worm wheel, a carrier fixed to said welding head assembly and movable radially relative thereto, and a welding disc journalled on said carrier about an axis normal to the axis of rotation of said welding head assembly.

3. In a circular welder, a stationary spindle assembly, a welding head assembly journalled axially of said spindle assembly, means for rotating said welding head assembly at various speeds relative to said spindle assembly, a carrier movably mounted on said welding head assembly for disposition at different radial positions thereon, and a welding head journalled on said carrier.

4. An attachment for spot-welding machines, comprising a spindle assembly adapted to be fixed to an electrode of a spot-welding machine, a welding head assembly having a shank portion rotatably received in said spindle assembly axially thereof, a worm wheel fixed to said welding head assembly below said spindle assembly, a worm gear carried by said spindle assembly meshing with said worm wheel, a carrier fixed to said welding head assembly and movable radially relative thereto, and a welding disc journalled on said carrier about an axis normal to the axis of rotation of said welding head assembly, said welding head assembly having a longitudinal bore therein, a flexible line communicating with said bore and connected to said carrier, said carrier having a passage therethrough with which said line is connected, a second flexible line coupled to said carrier and communicating with said passage, said welding head assembly having a passage therein communicating with said second flexible line, and transfer means between said spindle assembly and said welding head assembly connecting with the last mentioned passage.

5. A spot-welding machine comprising a frame, a carrier rotatably mounted on said frame with there being an anvil disposed in spaced relation below said carrier, a welding head assembly mounted on said carrier and including a disc-like welding head rotatably mounted on an axis parallel to said anvil so that the head may engage a workpiece on said anvil to roll therealong, said head assembly also including a cross piece upon which said welding head is mounted, means for adjusting the position of said cross piece relative to said carrier to vary the radial spacing between said welding head on the axis of rotation of said carrier, and means for rotatably driving said carrier so as to cause said welding head to roll in a circular path upon a workpiece.

6. The machine as defined in claim 5 wherein the last means incorporates a variable speed drive whereby the linear speed of said welding head may be varied to accommodate for the circumferential length of its path and for the thickness of the workpiece involved.

References Cited in the file of this patent
UNITED STATES PATENTS

| | | |
|---|---|---|
| 1,172,302 | Murray | Feb. 22, 1916 |
| 2,474,129 | Tramontini | June 21, 1949 |
| 2,697,768 | Wolk | Dec. 21, 1954 |